United States Patent [19]
Saito et al.

[11] Patent Number: 5,600,137
[45] Date of Patent: Feb. 4, 1997

[54] PROBE APPARATUS HAVING REDUCED MISALIGNMENT OF CONDUCTIVE NEEDLES

[75] Inventors: Mitsuchika Saito, Kawasaki; You-Wen Yi, Yokohama, both of Japan

[73] Assignee: Hewlett-Packard Company, Palo Alto, Calif.

[21] Appl. No.: 546,046

[22] Filed: Oct. 20, 1995

[30] Foreign Application Priority Data

Oct. 28, 1994 [JP] Japan ................................. 6-289259

[51] Int. Cl.$^6$ ............................ H01J 31/256; G11B 9/00
[52] U.S. Cl. ........................................... 250/306; 369/126
[58] Field of Search ........................... 250/306; 369/126

[56] References Cited

U.S. PATENT DOCUMENTS

| 5,216,631 | 6/1993 | Sliwa, Jr. ............................ 365/174 |
| 5,235,187 | 8/1993 | Arney et al. ........................ 250/306 |
| 5,276,672 | 1/1994 | Miyazaki et al. ................... 250/306 |
| 5,375,033 | 12/1994 | MacDonald ........................ 361/281 |

FOREIGN PATENT DOCUMENTS

| 4205828 | 7/1992 | Japan | ................. G11B 9/00 |
| 6060445 | 3/1994 | Japan | ................. G11B 9/00 |
| 7021598 | 1/1995 | Japan | ................. G11B 9/00 |
| WO8907256 | 8/1989 | WIPO | ................. G01N 23/00 |

OTHER PUBLICATIONS

Binnig et al., "The Scanning Tunneling Microscope", Sci. Am. 253:50 (1985).
Binnig et al., "Atomic Force Microscope", Physical Review Letters, 36:9 (3 Mar. 1986).

*Primary Examiner*—Jack I. Berman

[57] ABSTRACT

A probe apparatus includes a probe group supporting member having a substrate on which probes having conductive needles are formed. The main bodies of the probes are constructed from composite beams, e.g. L-shaped beams, formed by joining a plurality of arms, e.g. first and second arms, which extend from the substrate of the probe group supporting member, and which overhang the substrate in a direction parallel to the surface of the substrate. The conductive needles are attached perpendicular to the substrate surface at a selected point on each of the composite beams.

11 Claims, 13 Drawing Sheets

PROBE APPARATUS HAVING REDUCED MISALIGNMENT OF CONDUCTIVE NEEDLES

BACKGROUND OF THE INVENTION

1. Technical Field

The invention relates to a probe apparatus for use in moving-medium type memory device, in which minute probes are actuated by electrostatic force or by the force generated by a bimorph. More particularly, the invention relates to a probe apparatus of the forgoing type, in which misalignment of conductive needles associated with said probes is minimized or eliminated.

2. Description of the Prior Art

In recent years, various types of moving-medium type memory devices using minute probes have been proposed in place of hard-disk memories and semiconductor memory devices, such as CMOS devices (see Japanese Patent Application Kokai No. 4-98120, J. Sliwa, Jr., *Microvibratory Memory Device*, Japanese Patent Application Kokai No. 4-289580 (U.S. Pat. No. 5,216,631, issued Jun. 1, 1993), and Japanese Patent Application Kokai No. 4-364299). Such memory devices use scanning probe microscope technology, where bimorph-actuated long flat-plate-form cantilevers are used as probes. The reading and writing of data from and into the recording medium is performed using these cantilevers.

FIG. 1 shows an outline of a conventional moving-medium type memory device. The memory device shown in FIG. 1 consists of a probe apparatus 100, a memory substrate 200, a control circuit 300, and a write-read circuit 400. A plurality of cantilever type probes 101 which have conductive needles 102 formed on their tip ends, and which are actuated by a bimorph force, are formed on the surface of the probe apparatus 100. A memory medium 201 is formed on the surface of the memory substrate 200, and electrodes 202 that are used for reading and writing are formed beneath this memory medium 201. The probes 101 are actuated by signals sent to said probes 101 from the control circuit 300, and the write-read circuit 400 performs the reading and writing of data in the memory medium 201 by applying a write-read voltage across the conductive needles 102 at the tips of the probes 101 and the electrodes 202.

If the length of the probes 101 is too short, the distance of movement of the conductive needles 102 formed on the tips of said probes 101 with respect to the memory medium 201 cannot be set at a large value. Conversely, if the length of the probes 101 is too long, the conductive needles 102 tend to bend in the direction perpendicular to the direction of length of the probes 101 and parallel to the memory medium 201, i.e. in the horizontal direction, so that misalignment of the conductive needles 102 occurs. Furthermore, when the probes 101 are actuated, the probes necessarily bend in the direction of actuation, so that misalignment of the conductive needles 102 occur in the direction of length of the probes 101.

If the recording region (area) per bit is reduced to a small value, reading and writing errors tend to occur as a result of the above mentioned misalignment, so that the reliability of the system drops. Accordingly, to prevent such a drop in reliability, it is necessary to increase the size of the recording region. However, this leads to a new problem, i.e. an increase in the data recording density is prevented by the use of such a large recording region.

SUMMARY OF THE INVENTION

The invention provides a probe apparatus having reduced misalignment of the conductive needles, such that it can be used in moving-medium type memory devices. The invention provides a probe apparatus which has minute probes, such as in a moving-medium type memory device, wherein misalignment of the conductive needles of said probes tends not to occur when the probes are actuated. The invention also facilitates the driving of said probes.

Thus, the invention solves the above mentioned problems encountered in conventional minute probes used in moving-medium type memory devices by appropriately devising the driving mechanism and shape of said probes. The probe apparatus herein described has a probe group supporting member in which minute probes that have conductive needles are formed on a substrate. The probe apparatus can be used in devices such as moving-medium type memory devices and scanning probe microscopes.

For example, in cases where the probe apparatus is used in a memory device, the memory device is constructed from a memory substrate which has a memory medium formed on its surface, a probe group supporting member in which probes having conductive needles which are used for the reading or writing of data in the memory are formed on a substrate, a positioning device which is used to position the conductive needles in respective prescribed positions on the surface of the memory medium, with all of said needles being positioned at one time, write-read circuits which are used to read and write data in the memory medium via the conductive needles, and probe driving devices which are installed for each of the conductive needles, and which are used to place the surface of the memory medium and the tips of the conductive needles in a state of contact. A single probe may be installed in one probe apparatus, or a plurality of probes may be installed.

In cases where the probe is used in a memory device, a plurality of probes, preferably a large number of probes (e.g. 100,000 probes for one memory device), are installed. By installing a large number of probes, it is possible to achieve a great increase in the quantity of data that can be read or written per unit time. The arrangement of the probes may be either a one-dimensional arrangement or a two-dimensional arrangement. Ordinarily, however, a two-dimensional arrangement is used to increase the recording density.

The main bodies of the probes may be constructed from composite beams that are formed by joining a plurality of arms which extend from the substrate of the probe group supporting member, and which overhang said substrate in a direction parallel to the surface of said substrate. Parts of various shapes may be used as said composite beams. For example, said composite beams may be formed as roughly L-shaped parts consisting of first and second arms having two points fastened to the substrate as supporting points. Alternatively, said composite beams may be formed as Y- or T-shaped parts having three supporting points, or as roughly X-shaped parts having four supporting points. The conductive needles are attached to the composite beams at an appropriate location, ordinarily in the vicinity of the point of intersection of the arms, or at a point corresponding to said point of intersection, so that said conductive needles are perpendicular to the surface of the substrate. For example, in cases where the composite beams are L-shaped parts, the conductive needles are attached in the vicinity of the corner of each L-shaped beam. In cases where the composite beams are X-shaped parts, the conductive needles are attached in the vicinity of the cross-point of each X-shaped beam.

Similarly, in cases where the composite beams are Y- or T-shaped parts, the conductive needles are attached in the vicinity of the point where the respective arms of each Y- or T-shaped beam are joined together.

The probes may be designed so that said probes are actuated by the force generated by a bimorph, or they may be designed so that said probes are actuated by an electrostatic force. Probes which are actuated by an electrostatic force can be designed with a simpler structure than probes which are actuated by the force generated by a bimorph.

In cases where the probes are actuated by an electrostatic force, a member other than the substrate, such as the memory substrate or material being measured, can be used as a probe driving electrode, and an electrostatic force can be generated between said electrode and the probes. As the term is used herein, the member other than the substrate of the probe group supporting member refers to the memory medium in cases where the probe is applied to a memory device, and refers to the material being measured in cases where the probe is applied to a scanning probe microscope.

In the probe, the wiring connected to the probe driving devices and electrical circuitry used to apply a prescribed voltage to the conductive needles can be installed by an appropriate and optimally suitable method. For example, in cases where the composite beams are L-shaped beams, the system is ordinarily constructed so that the first arm of each composite beam has a first wiring arrangement which is connected to the probe driving device, and so that the second arm of each composite beam has a second wiring arrangement which is connected to an electrical circuit that is used to apply a prescribed voltage to the conductive needle. In this case, the electrode and the first wiring arrangement of the first arm are insulated from the second wiring arrangement of the second arm by an appropriate means. In cases where the composite beams are X-shaped, Y-shaped, or T-shaped parts, the system is ordinarily designed so that at least one arm of each beam has the first wiring arrangement, and so that at least one of the other arms which does not have said first wiring arrangement has the second wiring arrangement.

In cases where the probes are actuated by an electrostatic force, the composite beams can be made of silicon. For example, in cases where the composite beams are L-shaped parts, said beams can be constructed so that the first arm of each L-shaped beam functions as the first wiring arrangement, so that the second arm of each beam functions as the second wiring arrangement, and so that said first and second arms are insulated from each other by a PNP junction or NPN junction. In cases where the composite beams are X-shaped, Y-shaped, or T-shaped parts, an insulating part can be formed at an appropriate location, ordinarily in the vicinity of the cross-point in the case of an X-shaped part, or in the vicinity of the point where the respective arms are joined together in the case of a Y-shaped or T-shaped part, by means of a PNP junction or NPN junction.

The electrical circuitry which is used to apply a prescribed voltage to the conductive needles consists of write-read electrical circuitry in cases where the invention is applied to a memory device.

The main bodies of the probes may also be constructed from folded-back beams which overhang the substrate of the probe group supporting member in a direction parallel to the surface of said substrate. In this case, the initial end parts of the folded-back beams are fastened to the surface of the substrate of the probe group supporting member, and the conductive needles are attached to the final end parts of the folded-back beams.

Folded-back arms can also be constructed so that said arms have a first wiring arrangement which is connected to the probe driving device and a second wiring arrangement which is connected to the electrical circuit that is used to apply a prescribed voltage to the conductive needle, and so that said first wiring arrangement and second wiring arrangement are insulated from each other. In this case, the folded-back arms may be constructed so that both an arm on the side which has the initial end and an arm on the side which has the final end form electrodes which are used to generate an electrostatic force between said arms and the surface of the substrate or some member other than said substrate, or so that only the arm on the side which has the final end forms such an electrode.

In cases where both probes and various circuits, e.g. write-read circuits (hereafter referred to as W/R circuits) and probe driving circuits in the case of a memory device, are formed on the surface of the same substrate, circuit elements such as transistors, are formed so that they have a thickness on the surface of the substrate of the probe apparatus.

In cases where the probes are formed using silicon, the distance of movement of the probe tips must be increased. As a result, the following problem may arise, i.e. in cases where the probes are subjected to attractive-force control by generating an electrostatic force between the probes and the memory substrate, the driving force is reduced so that good control cannot be achieved. Accordingly, in cases where the probes are actuated by an electrostatic force, it is also possible to construct the probe apparatus so that electrode plates in which the electrodes have fins parallel to the substrate are installed on the main bodies of the probes, thus causing an electrostatic interaction between the probes and the member other than the substrate, i.e. the memory substrate or material being measured.

In regard to the position, shape, and number of the fins, various configurations are possible. For example, said fins may be formed at the same height as the main bodies of the probes, or may be formed so that they project upward from the main bodies of the probes. Furthermore, said fins may be formed so that they have the same width as the main bodies of the probes, or so that they are wider or narrower than the main bodies of the probes. In addition, a single fin may be installed on each probe main body, or a multiple number of fins may be installed.

The fins are ideal for use in the probe, but may also be applied to probe devices which have long flat-plate-form cantilever probes supported by a single point. In other words, in cases where the probe is an apparatus in which the probes are actuated by an electrostatic force, the probe main bodies may be formed so that they have a supporting point on the substrate and overhang said substrate in a direction parallel to said substrate. Electrode plates that overhang said substrate in a direction parallel to the surface of said substrate may be attached to said probe main bodies.

In cases where it is desired to increase the electrostatic interaction in conventional cantilever probes, it is necessary to increase the width of the probe main bodies. However, in cases where the width of the probe main bodies is increased, the spring constant of the probe main bodies is also increased. As a result, it becomes impossible to obtain a sufficient amount of bending. Because the spring constant is large, there is a large variation in the contact force accompanying any variation in the amount of bending.

In one embodiment of the invention, however, the probe main bodies are not used as electrodes which create an electrostatic interaction, nor as the main electrodes which create an electrostatic interaction. Instead, separate electrodes which are attached to the probe main bodies are used as electrodes which create an electrostatic interaction. As a result of this structure, the spring constant of the probe main bodies and the area of the vanes can be independently designed.

An effect and merit similar to those of the above mentioned vanes is also obtained without using such vanes by widening each probe main body in the vicinity of the position of attachment of the conductive needle, or by narrowing each probe main body in the area where said probe main body is attached to the substrate. In this way, it is possible to increase the electrostatic force even with a small spring constant.

The probes used in the present invention herein described can be manufactured by a separate process from the process used to manufacture the probe driving circuits, or they can be manufactured together with the probe driving circuits by means of a series of processes based on a monolithic semiconductor process and micro-machining.

In cases where the invention is applied to a memory device, it is desirable to manufacture the probes by means of a monolithic semiconductor process. As a result of using such a process, the manufacturing process of the numerous probes and circuits associated with said probes can be greatly simplified compared to conventional processes, so that the overall cost of the memory device can be reduced.

In cases where the probe is manufactured using a wafer, wafers having various layer structures can be used as the substrate. Ordinarily, the wafer used is a wafer consisting of a silicon surface layer, a silicon oxide intermediate layer, and a silicon undersurface layer, which wafer can easily be obtained from wafer makers. By using such a wafer, it is possible to form the probe main bodies (beams) from the silicon surface layer.

The probe can also be manufactured using a bulk silicon wafer. In this case, the probe main bodies are ordinarily formed using polysilicon which is laminated on the surface of a silicon oxide layer formed on the surface of a silicon layer.

BRIEF DESCRIPTION OF THE DRAWINGS

FIG. 13 illustrates one example of a memory substrate having lattice-form grooves formed in its surface which can be used in the memory device in accordance with the invention, where

DETAILED DESCRIPTION OF THE INVENTION

The following numeric designations are applied consistently herein and in the figures:

(1A) Semiconductor surface layer, (1B) Insulating intermediate layer, (1C) Semiconductor undersurface layer, (2) Probe, (21) Probe main body, (21A) First arm of L-shaped beam, (21B) Second arm of L-shaped beam, (210) P type region, (22) Conductive needle, (22a) Tip of conductive needle, (23) Grooves, (P1) Probe driving electrode, (P3) Probe driving auxiliary electrode, and (S) Surface of substrate of probe apparatus.

Figure 1:
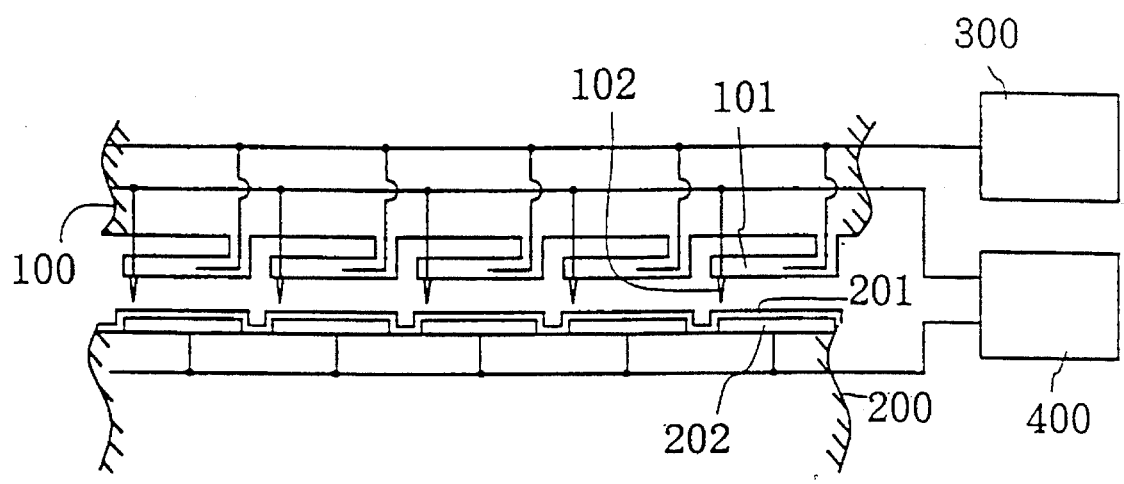
FIG. 1 is a schematic diagram that illustrates a conventional probe apparatus.
Figure 2:
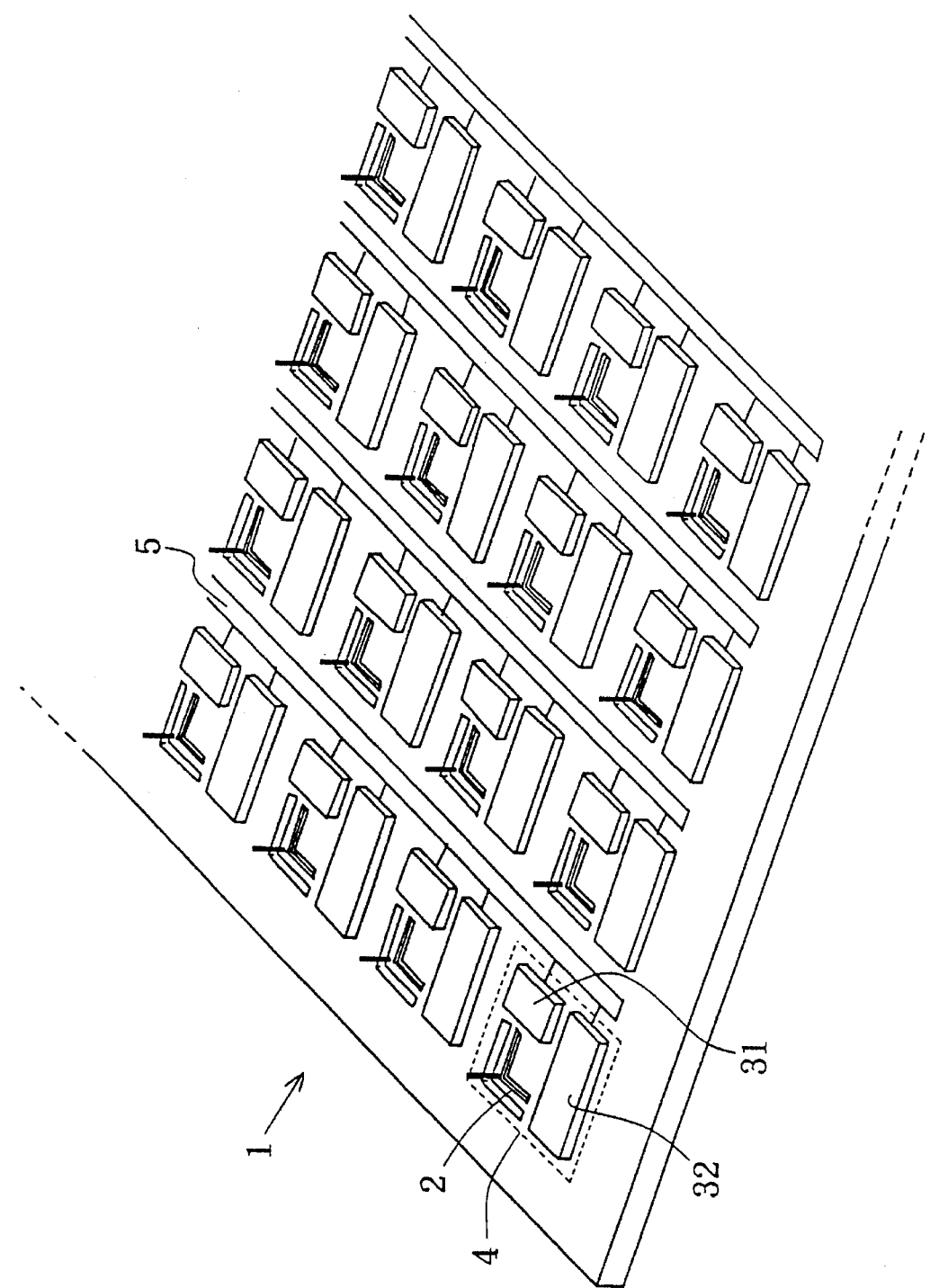
FIG. 2 illustrates a probe apparatus in accordance with the invention in which L-shaped beams are used as probes.

FIG. 2 illustrates an embodiment of the invention in which the probe herein disclosed is applied to a memory device. In FIG. 2, probes 2 are formed in an array in the probe apparatus 1. W/R circuits 31 and probe driving circuits 32, corresponding to said probes 2, are formed in the vicinity of each of said probes 2. The probes 2, W/R circuits 31, and probe driving circuits 32 constitute probe cells 4. Bus lines 5 are formed on the surface of the probe apparatus 1. The W/R circuits 31 and probe driving circuits 32 exchange signals with circuits installed on the periphery of the probe apparatus 1, via the bus lines 5 and terminals (not shown in the figures) formed on the probe apparatus 1. In the probe apparatus 1, the probes 2, W/R circuits 31, probe driving circuits 32, and bus lines 5 are formed by a monolithic semiconductor process (described below).

Figure 3:
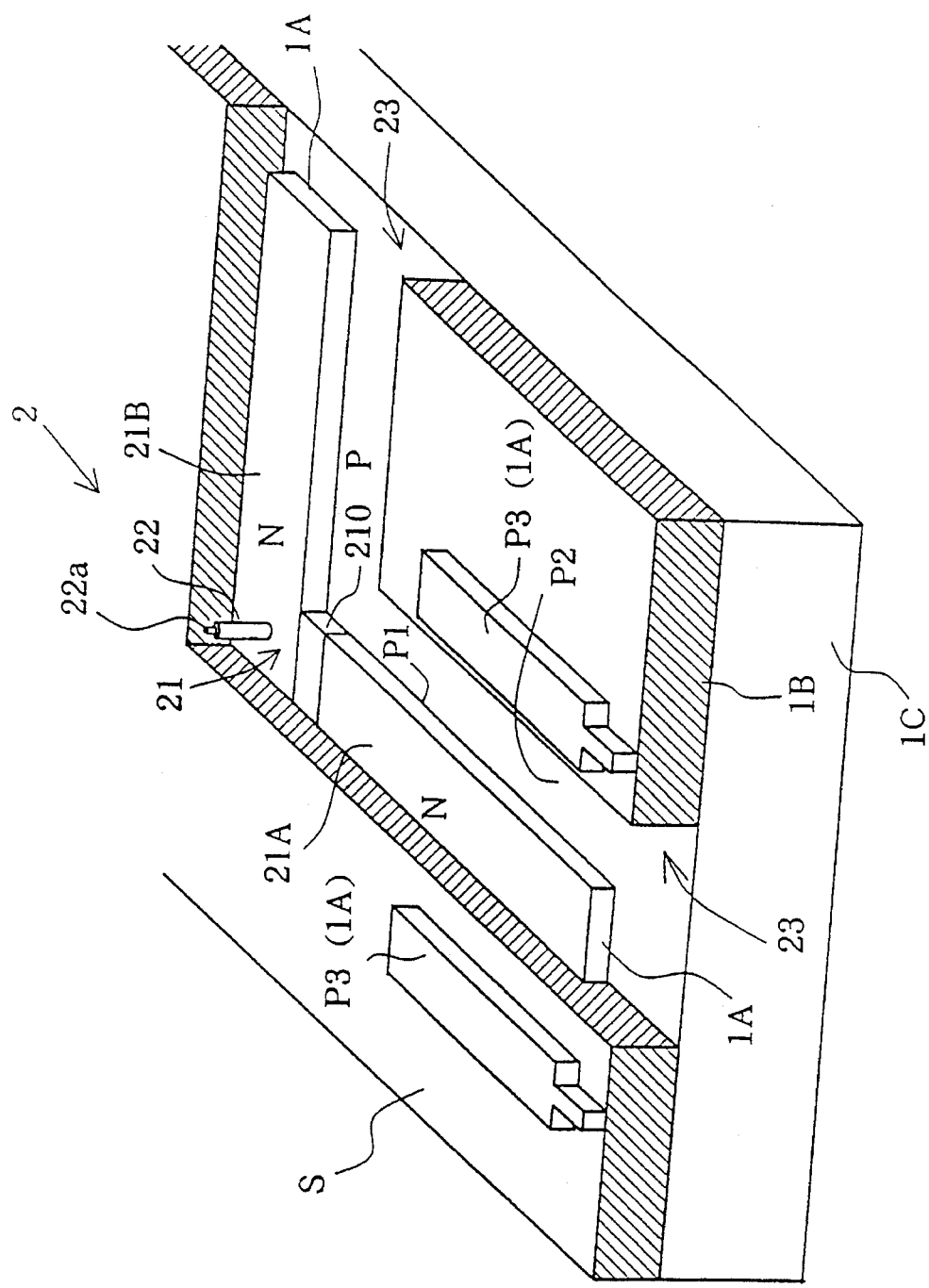
FIG. 3 is a magnification of one of the probes shown in FIG. 2.

One of the probes 2 shown in FIG. 2 is shown in detail in FIG. 3. This probe 2 is manufactured from a wafer consisting of 1A, 1B, and 1C (described below). The main body 21 of the probe 2 is constructed from an L-shaped beam consisting of first and second arms 21A and 21B which project in an overhanging manner from the probe apparatus 1. The supporting points of the probe main body 2 are not shown in FIG. 3.

The probe main body 21 is formed so that it projects in an overhanging manner over a groove 23. The semiconductor undersurface layer 1C is exposed at the bottom of this groove 23. The two arms 21A and 21B are formed from the semiconductor surface layer 1A. The first and second arms 21A and 21B are both N type semiconductors. A P type region 210 is formed in the boundary area between the first and second arms 21A and 21B, so that the first and second arms 21A and 21B contact each other while being insulated from each other by the P type region 210.

The undersurface of the first arm 21A constitutes a driving electrode P1 for the probe 2. A conductive needle 22 is formed on the corner end of the second arm 21B. The tip 22a of the conductive needle 22 is formed as a columnar body which has a uniform cross section. This tip 22a accomplishes contact with the memory medium 71 (see FIG. 5 below).

In FIG. 3, that portion of the exposed surface of the semiconductor undersurface layer 1C which faces the first arm 21A forms a second electrode P2. A pair of auxiliary electrodes P3, P3, formed from the semiconductor surface layer 1 A, are formed on the substrate surface S along the groove 23 on the side where the first arm 21A is located.

Figure 4A:
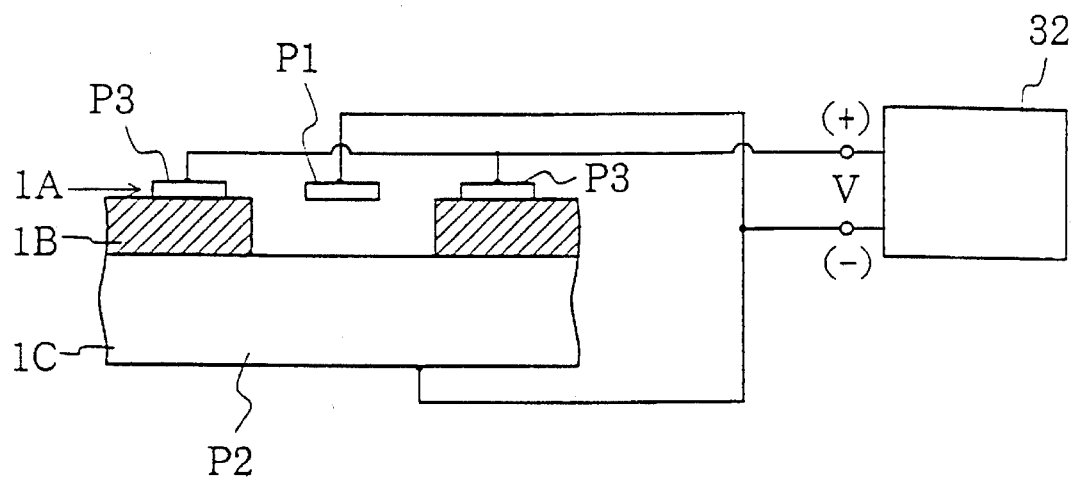
FIG. 4(A) is a schematic diagram of the wiring connections between the electrodes and the probe driving circuits in a case where the probes are controlled by repulsive-force control.

As is shown in FIG. 4(A), the electrodes P1, P2, and P3 are electrically connected to the probe driving circuit 32. In FIG. 4(A), the probe driving circuit 32 is connected so that the electrodes P1 and P2 are minus electrodes, and so that the auxiliary electrodes P3 are plus electrodes. The desired control is accomplished by applying an appropriate voltage V across the electrodes P1, P2, and P3.

Figure 5:
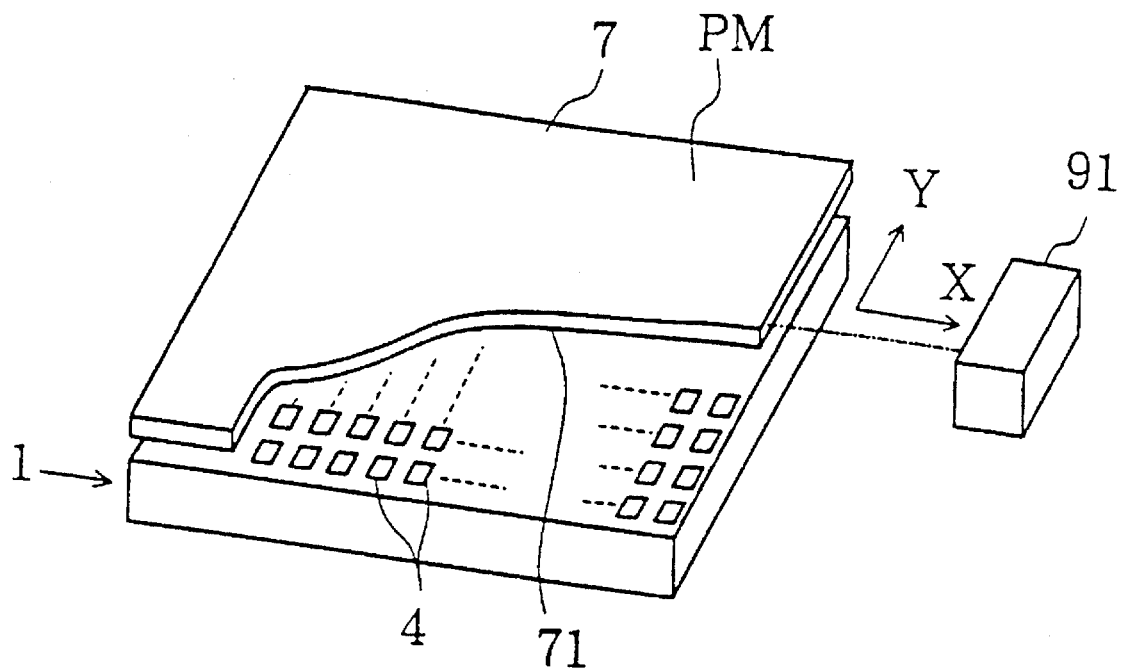
FIG. 5 shows an outline of a memory device constructed according to the invention.

FIG. 5 is an explanatory diagram which illustrates the memory device of the invention. FIG. 5 shows a probe apparatus 1 of the type described above, or of a type which is described below, including the probe cells 4 formed on the substrate 1, and a memory substrate 7. In FIG. 5, a positioning device 91 is used to position the respective conductive needles 22 (see FIG. 3) of the probes 2 (see FIGS. 2 and 3) in desired positions on a memory medium 71 which forms the surface layer of the memory substrate 7, with all of said needles being positioned at the same time. It is sufficient if the maximum distance of relative movement between the probe apparatus 1 and the memory substrate 7 is equal to the spacing of the conductive needles 22.

The probes 2 (shown in FIGS. 2 and 3) are positioned in prescribed positions by the positioning device 91 (shown in FIG. 5), and are subjected to repulsive-force control by the probe driving circuits 32. In the probes 2 (shown in FIGS. 2 and 3), the corner parts of the L-shaped beams are actuated with the supported parts of the two arms 21A and 21B as supporting points. In other words, the conductive needles 22 move perpendicularly with respect to the surface of the memory medium 71, but do not move horizontally with respect to said surface. Accordingly, there is no problem of misalignment of the conductive needles 22 due to bending of the probe main bodies 21 in the direction parallel to the substrate surface S. Thus, the conductive needles 22 can be accurately positioned.

FIG. 5 illustrates a case in which the X-Y movement of the memory substrate 7 is controlled by means of the positioning device 91. However, it is also possible to design the system so that the X-Y movement of the probe apparatus 1 is controlled. Alternatively, it is also possible to design the system so that the memory substrate 7 is controlled in the X direction and the probe apparatus 1 is controlled in the Y direction. In FIG. 5, the positioning device 91 is shown in conceptual terms, and differs from an actual positioning device.

In FIG. 2, the W/R circuits 31 and probe driving circuits 32 are installed in close proximity to the probes 2. Accordingly, the wiring distance between these circuits, especially the W/R circuits 9, and the probes is extremely short, so that the effects of stray capacitance and noise are almost negligible.

As is shown in FIG. 3, the conductive needle 22 of each probe 2 is connected with the corresponding W/R circuit 31 (see FIG. 2) via the second arm part 21B, which itself acts as wiring and wiring (not shown in the figures). If the probe main bodies are formed with a laminated structure, there may be cases where practical use is impossible due to warping of the probe main bodies during manufacture. However, because probe main bodies 21 constructed as shown in FIG. 3 have a single-layer structure, there is no warping that would cause any problem in terms of practical use.

In the memory device, the memory substrate 7 may be used as an electrode which interacts with the probes through electrostatic force. In this case, the probes are subjected to attractive-force control by means of the electrostatic force between said probes and the memory substrate 7. Ordinarily, the probes can be controlled with a smaller voltage in the case of attractive-force control than in the case of repulsive-force control.

In the case of the probe main bodies 21 (shown in FIGS. 2 and 3), the W/R circuits 31 and probe driving circuits 32 are ordinarily formed so that they project upward from the substrate surface S (see FIG. 3). As a result, the distance between the probe main bodies 21 and the memory substrate 7 is increased so that it may be impossible in some cases to achieve good control of the probes 2, even if the probes are driven using an attractive-force control.

Figure 6:
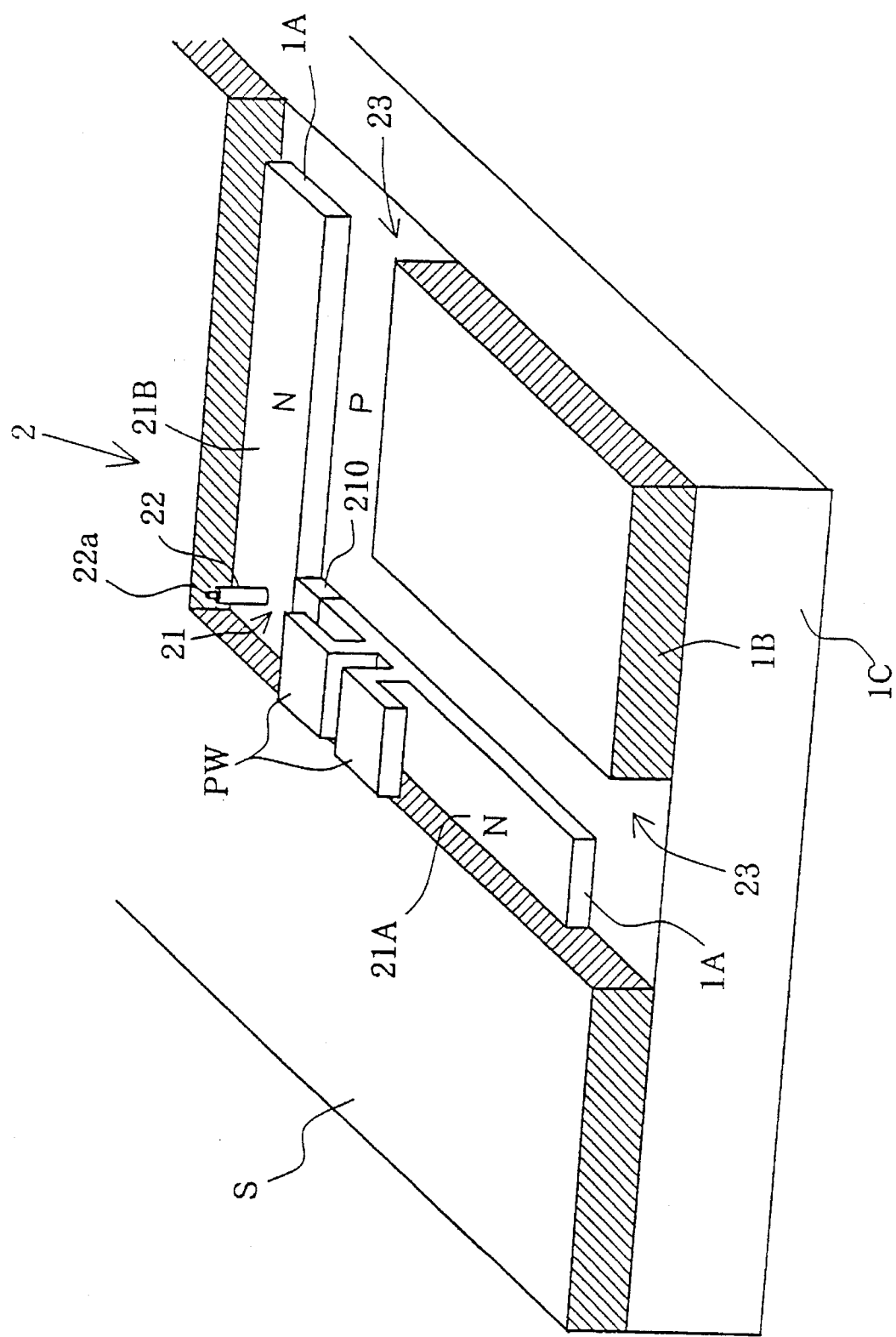
FIG. 6 illustrates an embodiment of the invention in which electrodes (PW) are installed on the probe shown in FIG. 3.

In such cases, as is shown in FIG. 6, electrodes PW which have vanes parallel to the memory substrate 7 may be formed at a prescribed height facing said memory substrate 7 on the tips of the probe main bodies 21. In this case, (as is shown in FIG. 6), the electrodes PW are installed on the first arm 21A of each probe. However, the auxiliary electrodes P3 shown in FIG. 3 are not installed. Attractive-force control is accomplished between the electrodes PW and an electrode PM formed on the memory substrate 7 by means of the wiring shown in FIG. 4(B).

Figure 4B:
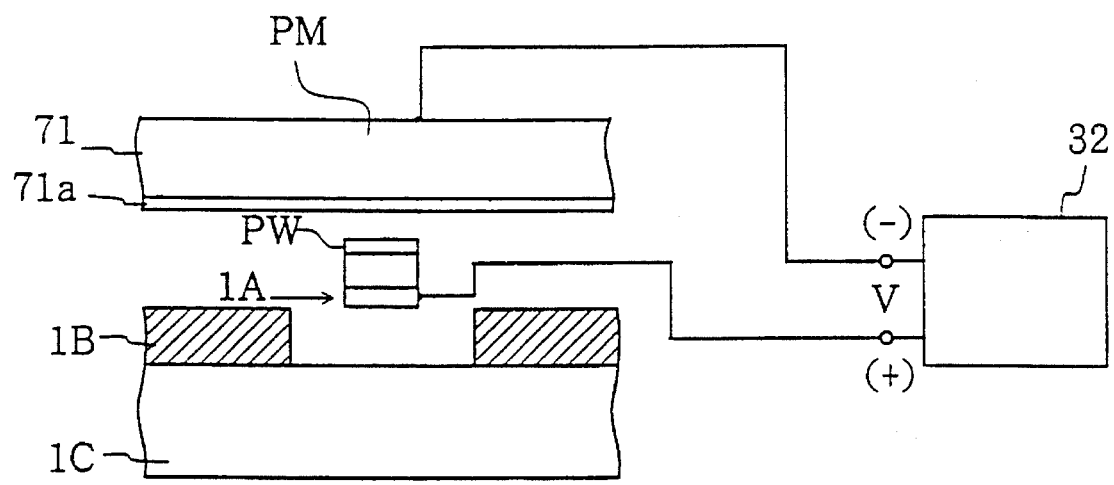
FIG. 4(B) is a schematic diagram of the wiring connections between the electrodes (PW) and the electrode (PM) in a case where the probes are controlled by attractive-force control.

FIG. 4(B) shows the polarity of the electrodes PW and PM in a case where the probes 2 are controlled by attractive-force control. The electrodes PW and PM are electrically connected to the corresponding probe driving circuit 32. In FIG. 4(B,) the probe driving circuit 32 is wired so that the electrode PM is a minus electrode and the electrodes PW are plus electrodes. The desired control can be achieved by applying an appropriate voltage V across PM and PW. By installing the electrodes PW, it is possible to control the probes 2 with a small voltage.

In a memory device using the probes 2 shown in FIGS. 3 and 6, the W/R circuits 31 and probe driving circuits 32 are installed in close proximity to the probes 2. Accordingly, the effects of stray capacitance and noise are almost negligible. In a memory device using the probes 2 shown in FIGS. 3 and 6, the second arm 21B of each probe is spatially separated from the first arm 21A. Accordingly, the stray capacitance generated in the second arm 21B, which functions as wiring is almost negligible.

It is self-evident that the probes 2 shown in FIG. 6 could easily be manufactured from the description in the present specification by a person skilled in micro-machining techniques and semiconductor device manufacturing techniques, as was described by the present applicant in a Japanese patent application (Mitsuchika Saito, You-Wen Yi, *A Memory Device*, Hewlett-Packard Company docket number 1094596-2).

Figure 7I:
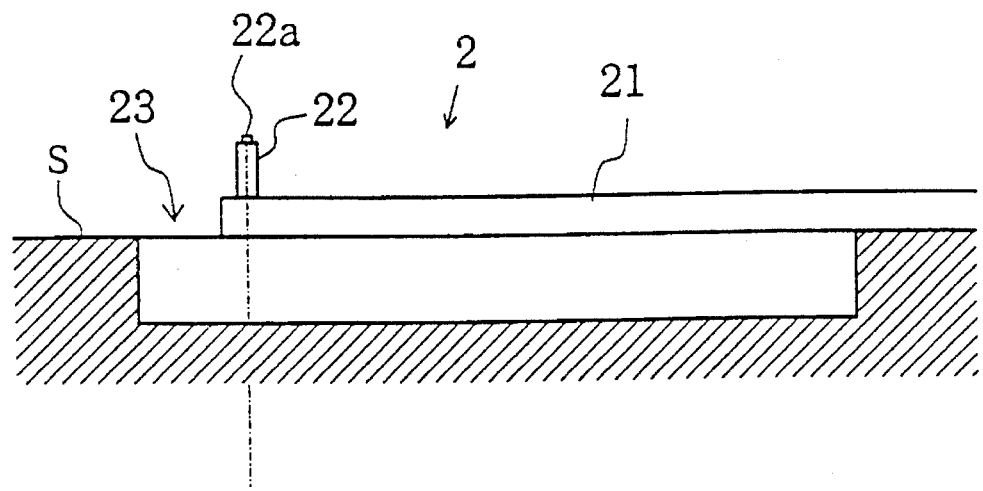
FIGS. 7(i) and 7(ii) constitute a diagram which illustrates problems encountered in conventional probes.
Figure 7:
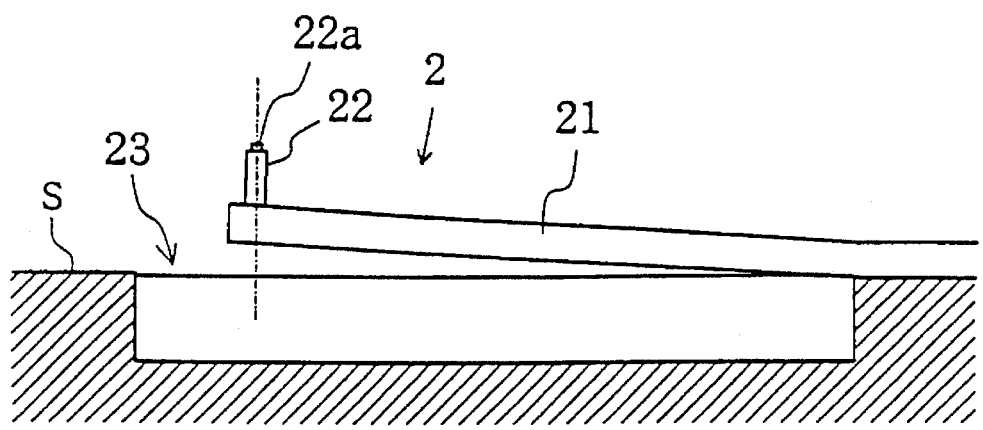

With regard to the probes 2 shown in FIGS. 3 and 6, there may be cases where the tips 22a of the conductive needles become misaligned in the direction parallel to the substrate surface S when the probes 2 are actuated (as shown in FIGS. 7(*i*) and (*ii*)). FIG. 7(*i*) shows the probe 2 of FIG. 3 prior to driving, while FIG. 7(*ii*) shows said probe 2 after driving.

To a certain extent, this misalignment is predictable and is compensable. However, in cases where said misalignment becomes a problem, it is possible to construct the probe main bodies 21 from folded-back beams consisting of arms 211 and 212, as shown in FIG. 8.

Figure 8:
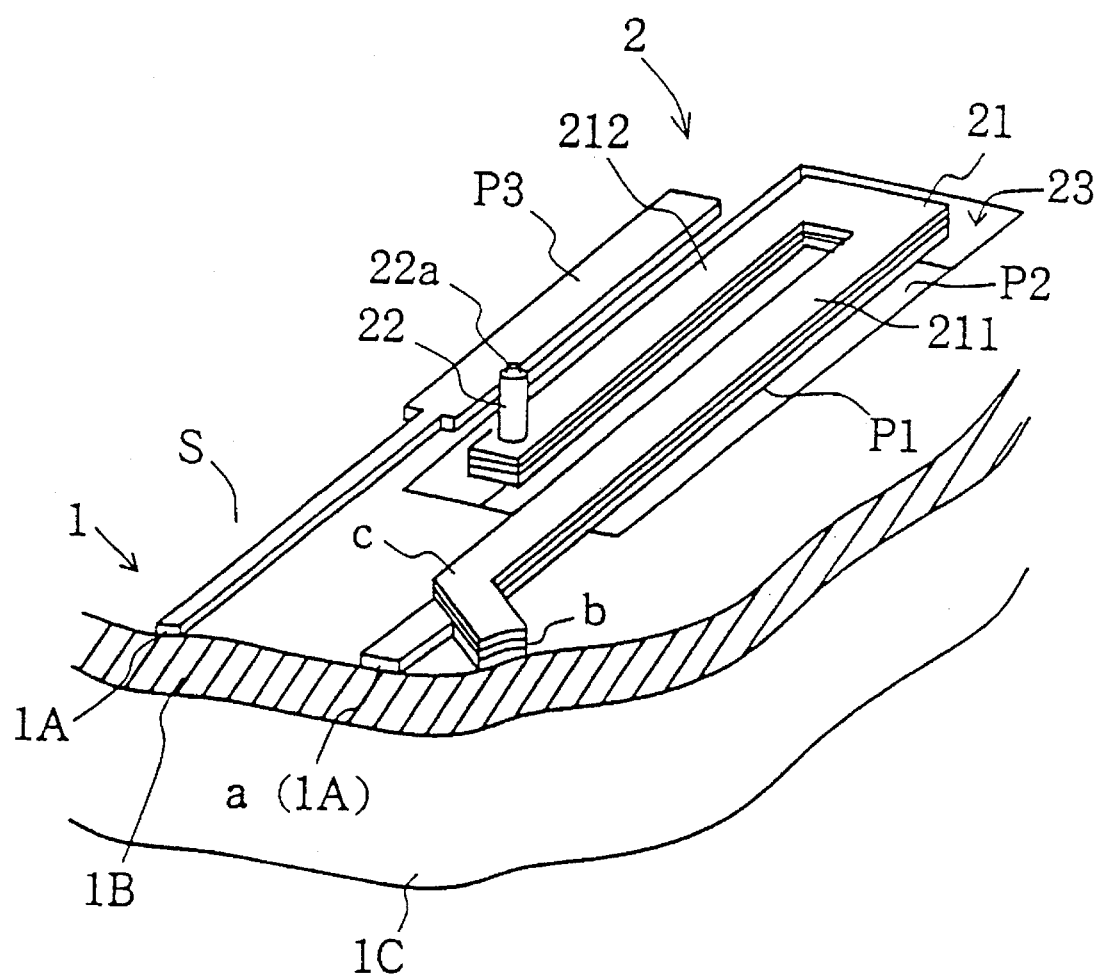
FIG. 8 illustrates a probe in accordance with the invention which has the shape of a folded-back beam.

In FIG. 8, the final end part of the arm 211 is fastened to the substrate of the probe apparatus 1, and the probe main body 21 is formed so that it projects in an overhanging manner from the substrate surface S. In one preferred embodiment of the invention, this substrate surface S consists of the surface of the insulating intermediate layer 1B. The conductive needle 22 is attached to the tip of the other final end part of the folded-back beam so that said needle faces the memory substrate 7 (see FIG. 5). The tip 22a of each conductive needle 22 is formed as a columnar body which has a uniform cross section. The probe main body 21 has a semiconductor layer a, which is formed from the semiconductor surface layer 1A, which is connected to the probe driving circuit 32 (see FIGS. 2 and 5), and an insulating layer b, which is formed on top of said semiconductor layer a. A metal wiring layer c is formed on the surface of said insulating layer b. The conductive needle 22 and the W/R circuit 31 (see FIG. 2) are electrically connected by this metal wiring layer c.

The probe main body 21 is formed so that it protrudes in an overhanging manner over a groove 23. The semiconductor undersurface layer 1C is exposed at the bottom of this groove 23. This semiconductor undersurface layer 1C and the semiconductor electrode layer a are insulated from each other by the insulating intermediate layer 1B. The semiconductor layer a forms a driving electrode P1, and the bottom surface of the groove 23, i.e. the exposed surface of the semiconductor undersurface layer 1C, forms a driving electrode P2. An auxiliary electrode P3, which is formed from the aforementioned semiconductor surface layer 1A, is formed on the substrate surface along the long part of the groove 23.

Figure 9:
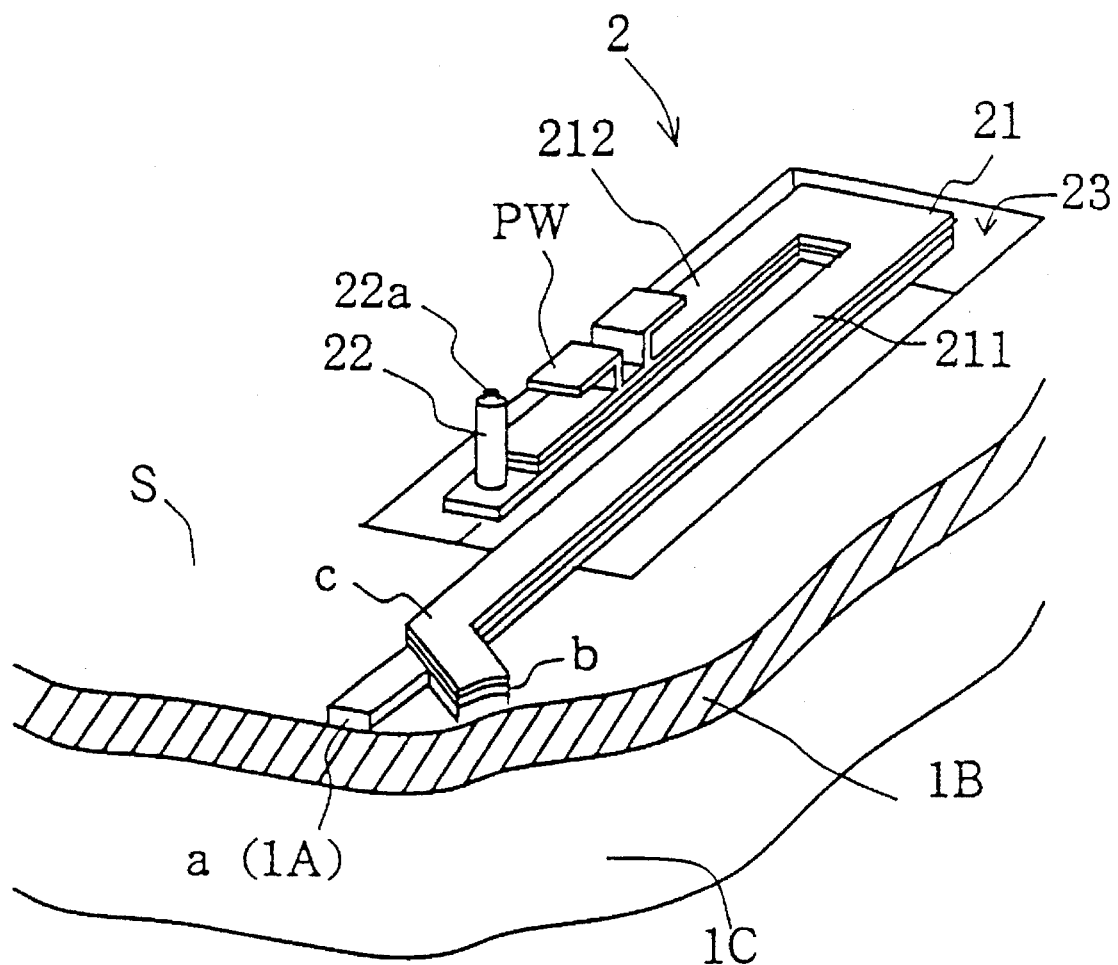
FIG. 9 illustrates a case in which electrodes (PW) are installed on one arm of the probe shown in FIG. 8.

FIG. 9 shows a case where electrodes PW are installed on the arm 212 of the probe main body 21 (shown in FIG. 8). The semiconductor layer a is exposed at the final end of the probe 2, and a conductive needle 22 is formed on said exposed portion. In this case, no auxiliary electrode P3 (see FIG. 8) is installed.

Figure 10:
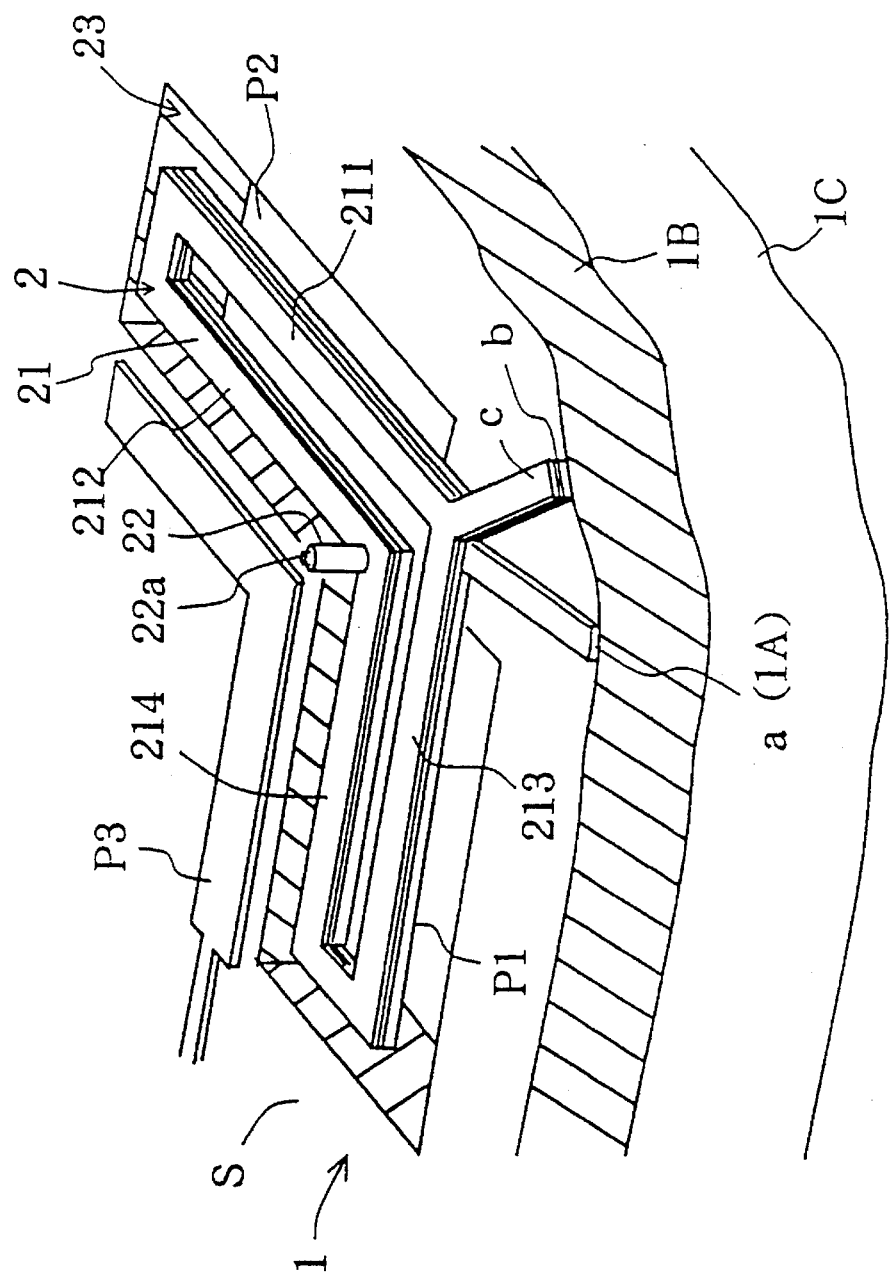
FIG. 10 illustrates a probe which has a shape formed by joining the tips of the respective arms of a pair of folded-back beams of the type used in the probe shown in FIG. 7.

FIG. 10 shows a probe 2 with a shape formed by joining the tips of the respective arms of a pair of the folded-back beams, shown in FIG. 9, with left-right symmetry. The probe main body 21 consists of arms 211, 212, 213 and 214 which project in an overhanging manner parallel to the substrate surface S of the probe apparatus 1. The arms 211 and 212 are parallel to each other, and the arms 213 and 214 are parallel to each other. The probe main body 21 is made up of these arms 211–214. The corner part of the L-shaped beam formed by the arms 211 and 213 is fastened to the substrate of the probe apparatus 1. A conductive needle 22 is attached to the corner part of the L-shaped beam formed by the arms 212 and 214. An electrode P1 is formed on the undersurface of the respective arms 211–214. A metal wiring layer c, which is used to connect the conductive needle 22 and the W/R circuit, is installed on the respective arms 211–214.

Figure 11:
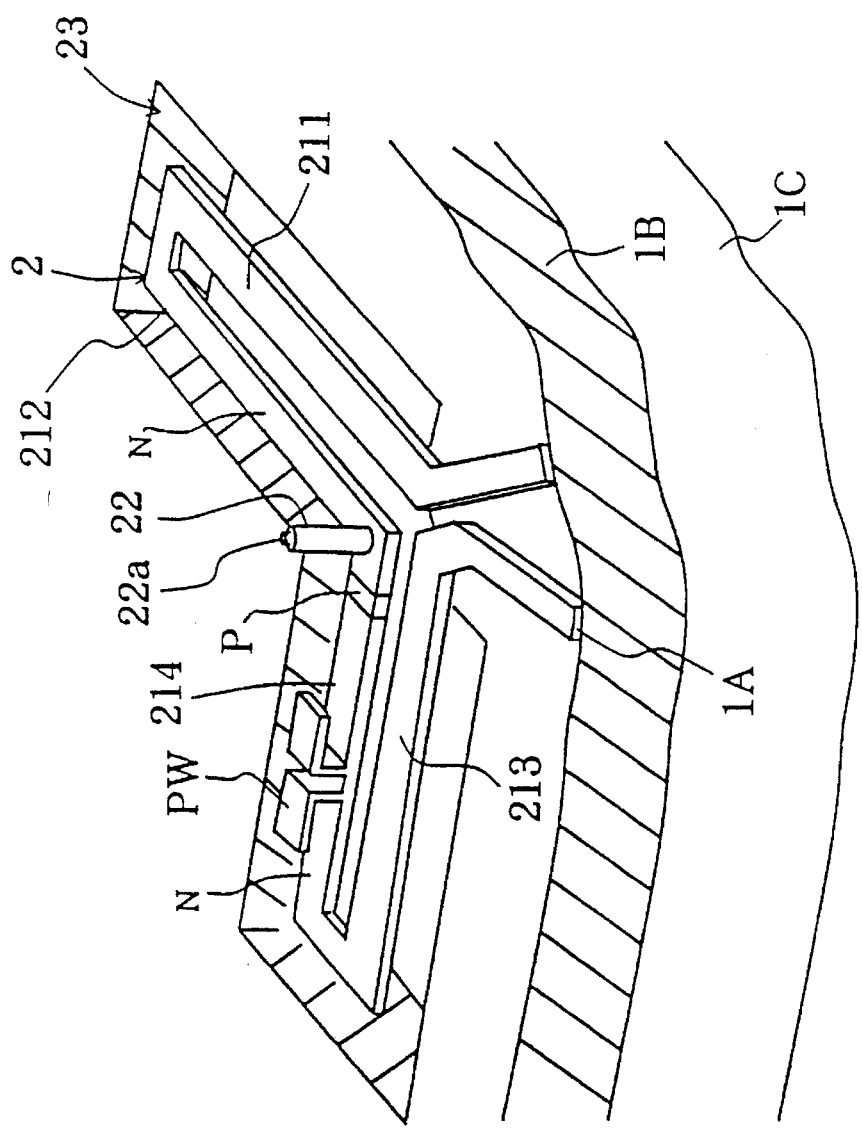
FIG. 11 illustrates a probe equipped with electrodes (PW), in which the NPN insulating structure of the probe shown in FIG. 6 is applied to a probe with the folded-back structure shown in FIG. 10.

FIG. 11 shows an electrode-equipped probe 2, in which the NPN insulating structure of the probe shown in FIG. 6 is applied to a probe with the folded-back structure shown in FIG. 10. The electrode PW performs attractive-force control using the electrostatic force between said electrode and the memory substrate 7 (see FIG. 5). In cases where probe main bodies with laminated structures such as those shown in FIGS. 9 and 10 are used, warping may occur during manufacture so that practical use becomes impossible. However, the probe main body 21, shown in FIG. 11, has a single-layer structure. Accordingly, as in the case of the probe shown in FIG. 6, there is no warping that would cause any problem in terms of practical use.

Figure 12I:
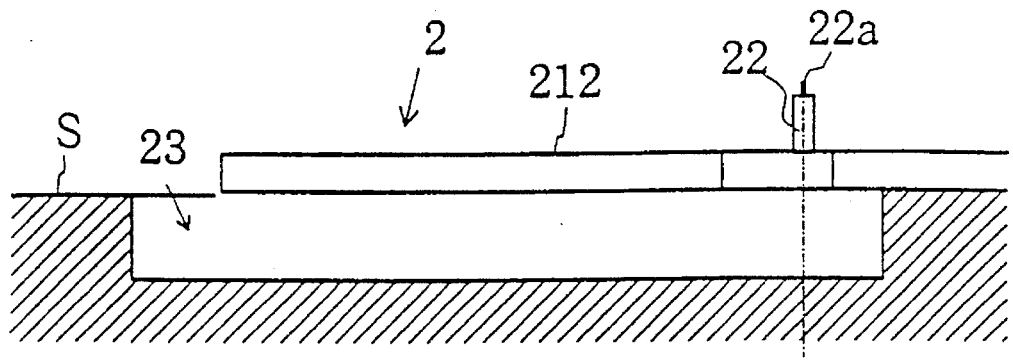
FIGS. 12(i) and 12(ii) illustrate the actuation of probes which have a folded-back bridge shape.
Figure 12:
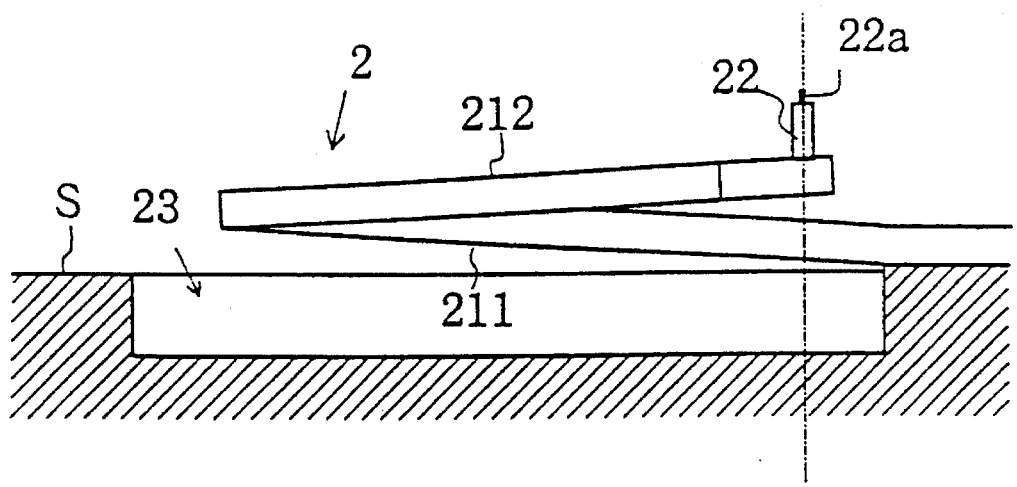

By forming the probes with folded-back beam shapes, as shown in FIGS. 8–11, it is possible to construct the system so that misalignment of the conductive needles 22a is more or less eliminated, regardless of the degree of movement of the probe main bodies 21 (as is shown in FIGS. 12(i) and (ii), where FIG. 12(i) shows the probe 2 of FIG. 8 prior to driving, and FIG. 12(ii) shows said probe 2 after driving).

The memory substrate 2 used in the memory device may be constructed in various ways. For example, a flat-plate-form substrate with a memory medium 21 formed on its surface, or a substrate in which lattice-form grooves are formed in said flat-plate-form memory medium, may be used.

Figure 13A:
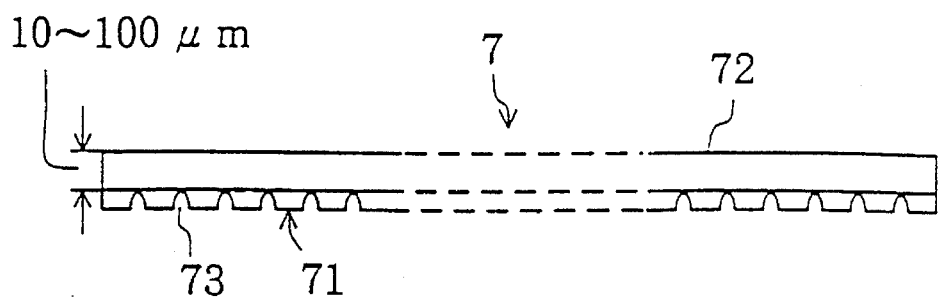
FIG. 13(A) is a model sectional view.
Figure 13B:
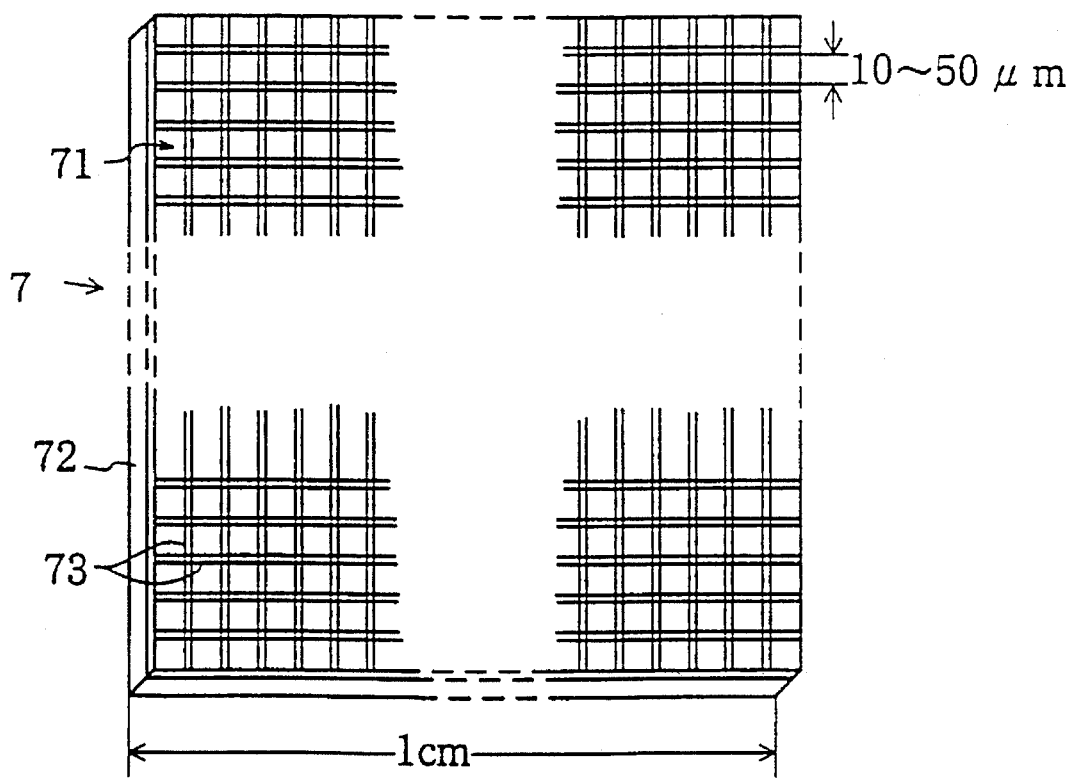
FIG. 13(B) is a model plan view.

FIGS. 13(A) and 13(B) are a model sectional view and a model plan view, respectively, that illustrate one example of a memory substrate 7 having lattice-form grooves formed in its surface, and which can be used in the memory device of the invention. The memory substrate 7 Si substrate has a thickness of approximately 10 to 100 microns, and forms square tiles which are approximately 1 cm on a side. This memory substrate 7 is formed by laminating a substrate 72 and a memory medium 71. Separating grooves 73 are formed in the memory substrate 7 over the entire surface of said substrate 7.

Generally, if a memory substrate is too thin, warping caused by thermal expansion or thermal contraction of said substrate during manufacture tends to occur. However, because the memory substrate 7 (shown in FIGS. 13(A) and (B)) has separating grooves 73 formed in its surface, there is no warping that would cause any problem in terms of practical use, even if said memory substrate 7 is thin. Accordingly, in cases where the positioning device 91 (see FIG. 5 moves the memory substrate 7, high-speed movement of said memory substrate 7 is possible as a result of the reduction in weight achieved. The grooves 73 can be formed by such methods, for example as photolithography and etching.

It is ordinarily desirable that the separating grooves 73 be formed so that said grooves 73 are positioned at the boundaries of the respective recording regions of the memory medium 71, each of said recording regions being the region accessed by one probe. If the spacing of the separating grooves 73 is too large, warping cannot be reduced by the desired amount. Said separating grooves 73 are ordinarily formed at the boundaries of all of the recording regions. If the spacing of the separating grooves 73 is too small, it becomes impossible to position said separating grooves 73 at the boundaries of adjacent recording regions.

In cases where warping caused by thermal expansion or thermal contraction during manufacture is a problem, the separating grooves 73 may be formed so that the depth of said grooves 73 is equal to half or more of the thickness of the memory substrate 7.

The probe invention herein has a probe group supporting member in which probes with conductive needles are formed on a substrate. The main bodies of the probes are constructed from composite beams formed by joining a plurality of arms which extend from the substrate of the probe group supporting member, and which overhang said substrate in a direction parallel to the surface of said substrate. The conductive needles are attached perpendicular to the substrate surface at some point on each of the composite beams.

The probe invention includes at least the preferred working configurations described below:

A probe apparatus in which at least one of the arms making up each composite beam has a first wiring arrangement which is connected to the probe driving device; at least one of the other arms of each composite beam has a second wiring arrangement which is connected to an electrical circuit that is used to apply a prescribed voltage to the conductive needle; and the first wiring arrangement and the second wiring arrangement are insulated from each other.

A probe apparatus in which the first arm, or arms, have an electrode that generates an electrostatic force between said arm(s) and the substrate connected to the first wiring arrangement, or between said arm(s) and a member other than said substrate.

A probe apparatus in which the composite beams consist of silicon, the first arm (or arms) function as the first wiring arrangement; the other arm (or arms) function as the second wiring arrangement; and the first arm (or arms) and the other arm (or arms) are insulated from each other by a PNP junction or an NPN junction.

A probe apparatus in which the composite beams are constructed from roughly L-shaped beams, each consisting of a first arm and a second arm which project in an overhanging manner parallel to the surface of the substrate of the probe group supporting member; the end parts of the first and second arms located at the opposite ends of said arms from the corner part of the L-shaped beam are fastened to the substrate of the probe group supporting member; and the conductive needles are attached to the corner parts of the L-shaped beams, so that said needles are perpendicular to the surface of the substrate.

A probe apparatus which has a probe group supporting member in which probes with conductive needles are formed on a substrate; the main bodies of the probes are constructed from folded-back beams which overhang the substrate of the probe group supporting member in a direction parallel to the surface of said substrate; the initial end parts of the folded-back beams are fastened to the surface of the substrate of the probe group supporting member; and the conductive needles are attached to the final end parts of the folded-back beams.

A probe apparatus in which the folded-back arms have a first wiring arrangement which is connected to the probe driving device and a second wiring arrangement which is connected to the electrical circuit that is used to apply a prescribed voltage to the conductive needle; and the first wiring arrangement is insulated from the second wiring arrangement of the second arm.

A probe apparatus in which both the arm on the side which has the initial end and the arm on the side which has the final end have electrodes which are used to generate an electrostatic force between said arms and the surface of the substrate or some member other than said substrate, or by the fact that only the arm on the side which has the final end has such an electrode.

A probe apparatus in which the member other than the substrate, and the probes, interact through electrostatic force.

A probe apparatus in which the electrodes have electrode plates with vanes parallel to the substrate, and said electrode plates interact electrostatically with a member other than the substrate.

A probe apparatus in which the portions of the probes that are fastened to the substrate are formed with a narrow width, or by the fact that the portions of the probes on which the conductive needles are formed have a broad width.

A probe apparatus in which the substrate is manufactured from a wafer which consists of a semiconductor surface layer, an insulating intermediate layer, and a semiconductor undersurface layer, and the probe main bodies are formed from the semiconductor surface layer of said wafer.

As a result of being constructed as described above, the invention offers at least the following advantages:

Misalignment of the conductive needles tends not to occur when the probes are actuated. Accordingly, the reliability of the probe apparatus is high. Especially in cases where the invention is applied to a memory device, the recording region (area per bit) can be reduced, and the recording density can be increased, compared to conventional memory devices using long flat-plate-form cantilevers.

Because either probes actuated by electrostatic force or probes actuated by piezoelectric force can be used in the invention, the freedom of design of the probe apparatus is increased.

In cases where the probes are actuated by electrostatic force, said probes can be actuated by the electrostatic force generated between said probes and a member other than the substrate of said probes, e.g. a memory substrate. Accordingly, the probe driving force can be increased. In particular, by installing electrodes on the probes, it is possible to insure a sufficient driving force, even in cases where various electrical circuits protrude from the surface of the substrate of the probe apparatus.

In cases where the invention is applied to a memory device, the use of composite beams e(.g. L-shaped beams consisting of first and second arms) makes it possible to construct the system so that the wiring which performs data transmission (e.g. the second arm of each beam in the case of L-shaped beams), and the arm of each probe which has a driving electrode (e.g. the first arm of each beam in the case of L-shaped beams) are spatially separated from each other. In such a case, the stray capacitance generated between the wiring used for the reading and writing of data and the electrodes can be minimized.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A probe apparatus, comprising:

a probe group supporting member having a substrate surface on which probes having conductive needles are formed;

wherein main bodies of said probes are constructed from composite beams formed of silicon, said composite beams being formed by joining a plurality of arms which extend from the substrate of the probe group supporting member, and which overhang said substrate in a direction parallel to the surface of said substrate, said composite beams further comprising a first arm which functions as a first wiring arrangement and a second arm which functions as a second wiring arrangement;

wherein said first arm further comprises an electrode that generates an electrostatic force between said arm and said substrate, said electrode being connected either to said first wiring arrangement or between said arm and a member other than said substrate;

wherein said first arm and said second arm are insulated from each other by either a PNP junction or an NPN junction; and wherein said conductive needles are attached perpendicular to the substrate surface at a point on each of said composite beams.

2. The probe apparatus of claim 1, wherein at least one of the arms making up each composite beam further comprises:

a first wiring arrangement which is connected to a probe driving device; and wherein at least one of the other arms of each composite beam further comprises:

a second wiring arrangement which is connected to an electrical circuit that is used to apply a prescribed voltage to said conductive needles;

wherein said first wiring arrangement and said second wiring arrangement are insulated from each other.

3. The probe apparatus of claim 1, wherein said composite beams are constructed from roughly L-shaped beams, each beams consisting of a first arm and a second arm which project in an overhanging manner parallel to the surface of the substrate of the probe group supporting member;

wherein end parts of the first and second arms located at the opposite ends of said arms from a corner part of the L-shaped beam are fastened to the substrate of the probe group supporting member; and wherein said conductive needles are attached to said corner parts of the L-shaped beams, so that said needles are perpendicular to the surface of the substrate.

4. A probe apparatus having reduced misalignment of conductive needles, comprising:

a probe group supporting member in which probes having conductive needles are formed on a substrate surface;

wherein main bodies of said probes are constructed from folded-back beams which overhang the substrate of the probe group supporting member in a direction parallel to the surface of said substrate;

wherein a member, other than the substrate, and said probes interact through electrostatic force;

wherein initial end parts of said folded-back beams are fastened to the surface of the substrate of the probe group supporting member; and wherein said conductive needles are attached to final end parts of the folded-back beams.

5. The probe apparatus of claim 4, wherein said folded-back arms further comprise:

a first wiring arrangement which is connected to a probe driving device; and a second wiring arrangement which is connected to an electrical circuit that is used to apply a prescribed voltage to the conductive needles; and wherein said first wiring arrangement is insulated from said second wiring arrangement of a second arm.

6. The probe apparatus of claim 5, wherein both an arm on a side which has an initial end and an arm on a side which has a final end further comprise:

electrodes which are used to generate an electrostatic force between said arms and either the surface of the substrate or a member other than said substrate, or by the fact that only the arm on the side which has the final end has such an electrode.

7. The probe apparatus of claim 5, wherein an arm on a side which has a final end further comprises:

an electrode which is used to generate an electrostatic force between said arm and either the surface of the substrate or a member other than said substrate.

8. The probe apparatus of claim 4, further comprising:

electrodes having electrode plates with vanes parallel to the substrate, and wherein said electrode plates interact electrostatically with a member other than said substrate.

9. The probe apparatus of claim 4, wherein portions of said probes that are fastened to said substrate are formed with a narrow width.

10. The probe apparatus of claim 4, wherein portions of said probes on which said conductive needles are formed have a broad width.

11. The probe apparatus of claim 4, wherein said substrate is manufactured from a wafer that consists of a semiconductor surface layer, an insulating intermediate layer, and a semiconductor undersurface layer, and wherin said probe includes main bodies that are formed from said semiconductor surface layer of said wafer.

* * * * *